US006686308B2

(12) United States Patent
Mao et al.

(10) Patent No.: US 6,686,308 B2
(45) Date of Patent: Feb. 3, 2004

(54) SUPPORTED NANOPARTICLE CATALYST

(75) Inventors: Shane Shanhong Mao, Woodbury, MN (US); Guoping Mao, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 43 days.

(21) Appl. No.: 10/005,524

(22) Filed: Dec. 3, 2001

(65) Prior Publication Data

US 2003/0104936 A1 Jun. 5, 2003

(51) Int. Cl.[7] ........................... B01J 21/18; H01M 4/88; H01M 4/86; C22C 32/00; B22F 1/00
(52) U.S. Cl. ..................... 502/180; 502/101; 502/182; 502/185; 502/527.14; 502/527.24; 429/40; 429/41; 429/42; 75/252; 419/11; 419/23
(58) Field of Search ................................ 501/101, 180, 501/182, 185, 527.14, 527.24; 429/40–42; 75/252; 419/11, 23

(56) References Cited

U.S. PATENT DOCUMENTS

| 4,136,059 | A | * | 1/1979 | Jalan et al. ................. 252/447 |
| 4,629,709 | A | | 12/1986 | Belloni Cofler et al. ......... 502/5 |
| RE33,149 | E | * | 1/1990 | Petrow et al. ................. 429/40 |
| 5,374,598 | A | * | 12/1994 | Stonehart et al. ........... 502/185 |

(List continued on next page.)

FOREIGN PATENT DOCUMENTS

| CN | 1259395 A | 7/2000 |
| DE | 197 45 904 A1 | 4/1999 |
| EP | 1 175 948 A2 | 1/2002 |

OTHER PUBLICATIONS

Wang et al., "Preparation of Tractable Platinum, Rhodium, and Ruthenium Nanoclusters with Small Particle Size in Organic Media," *Chem. Mater.*, (2000), vol. 12, pp. 1622–1627. Jan. 2000.

(List continued on next page.)

*Primary Examiner*—Mark L. Bell
*Assistant Examiner*—Patricia L. Hailey
(74) *Attorney, Agent, or Firm*—Philip Y. Dahl (57) ABSTRACT

A supported catalyst is provided comprising catalyst metal nanoparticles having an average particle size of 3.0 nm or less, or more typically 2.0 nm or less, and typically having a standard deviation of particle size of 0.5 nm or less, which are supported on support particles at a loading of 30% or more. Typical catalyst metals are selected from platinum, palladium, ruthenium, rhodium, iridium, osmium, molybdenum, tungsten, iron, nickel and tin. Typical support particles are carbon. A method of making a supported catalyst is provided comprising the steps of: a) providing a solution of metal chlorides of one or more catalyst metals in solvent system containing at least one polyalcohol, typically ethylene glycol containing less than 2% water; b) forming a colloidal suspension of unprotected catalyst metal nanoparticles by raising the pH of the solution, typically to a pH of 10 or higher, and heating said solution, typically to 125 ° C. or higher; c) adding support particles to the colloidal suspension; and d) depositing the unprotected catalyst metal nanoparticles on the support particles by lowering the pH of said suspension, typically to a pH of 6.5 or lower.

22 Claims, 9 Drawing Sheets

U.S. PATENT DOCUMENTS

| | | | | |
|---|---|---|---|---|
| 5,480,851 A | * | 1/1996 | Tsurumi et al. | 502/185 |
| 5,489,563 A | | 2/1996 | Brand et al. | 502/185 |
| 5,759,230 A | * | 6/1998 | Chow et al. | 75/362 |
| 5,861,222 A | * | 1/1999 | Fischer et al. | 429/42 |
| 5,876,683 A | * | 3/1999 | Glumac et al. | 423/325 |
| 6,066,410 A | | 5/2000 | Auer et al. | |
| 6,391,818 B1 | * | 5/2002 | Bonsel et al. | 502/159 |
| 6,506,228 B2 | * | 1/2003 | Lee et al. | 75/351 |
| 2002/0009626 A1 | * | 1/2002 | Terazono et al. | 429/30 |
| 2002/0034675 A1 | * | 3/2002 | Starz et al. | 429/42 |

OTHER PUBLICATIONS

Ruth et al., "Electrocatalytic Systems for PEM Fuel Cells Recent Developments at $DMC^2$", *Abstract for Fuel Cell Seminar*, (2000), pp 40–43. No month avail.

Viau, G., et al: "Heterogeneous Nucleation and Growth of Metal Nanoparticles in Polyols", Scripta Materialia, Elsevier, New York, N.Y. U.S., vol. 44, Nos. 8–9, (May 18, 2001) pp. 2263–2267.

Kurihara, L. K. et al: "Nanocrystaline Metallic Powders and Films Produced by the Polyol Method", Nanostructured Materials, Elsevier, New York, N.Y., U.S., vol. 5, No. 6, (Aug. 1, 1995), pp. 607–613.

* cited by examiner

SUPPORTED NANOPARTICLE CATALYST

FIELD OF THE INVENTION

This invention relates to a supported catalyst having exceptionally small catalyst nanoparticles deposited on support particles in relatively high loading ratios, and methods of making same.

BACKGROUND OF THE INVENTION

Wang et al., "Preparation of Tractable Platinum, Rhodium, and Ruthenium Nanoclusters with Small Particle Size in Organic Media," *Chem. Mater.*, v. 12, pp. 1622–1627 (2000) and Chinese Patent App. No. CN1259395A disclose "unprotected" platinum nanoclusters and methods of their manufacture, i.e., platinum nanocluster colloids in organic solvents without protecting agents such as surfactants, polymers, or organic ligands.

U.S. Pat. No. 4,629,709 discloses non-noble metal microaggregates obtained by irradiating a solution of a metal salt and an oxidizing radical scavenger with ionizing radiation. The reference discloses the use of the dispersed microaggregates as catalysts for the photoreduction of water into hydrogen.

U.S. Pat. No. 4,136,059 discloses a method for producing a dispersion of platinum particles by mixing an aqueous solution of chloroplatinic acid or a salt thereof with sodium dithionate and hydrogen peroxide.

U.S. Pat. No. 5,489,563 discloses a method of making a ternary platinum alloy catalyst on a conductive carbon carrier by concurrently precipitating alloy components onto the carbon carrier by reduction of their nitrate salts.

Table I demonstrates the relationship of particle size and Pt loading in commercial catalysts available from Degussa AG, Düsseldorf, Germany (reported in Ruth et al., "Electrocatalytic Systems for PEM Fuel Cells Recent Developments at $DMC^2$", Abstract for Fuel Cell Seminar 2000). Higher catalyst (Pt) loading appears to be linked to larger catalyst particle size. Larger particle size reduces the available surface area and therefore results in lowered catalytic activity. Table I also lists the theoretical catalyst surface area as calculated from particle size.

TABLE I

| (Comparative) | | | | | |
| --- | --- | --- | --- | --- | --- |
| Catalyst (Pt) loading (wt %) | 20 | 30 | 40 | 50 | 60 |
| Catalyst (Pt) Particle Size (nm) | 3.5 | 4.0 | 5.0 | 8.0 | 9.0 |
| Theoretical Catalyst Surface Area ($m^2/g$) | 80 | 70 | 56 | 35 | 31 |

Table II demonstrates the relationship of particle size and Pt loading in commercial catalysts available from E-TEK Div. of De Nora N. A., Somerset, N.J. (reported at E-TEK website http://www.etek-inc.com/C1–7.html). Again, higher catalyst (Pt) loading appears to be linked to larger catalyst particle size. Table II also lists the theoretical catalyst surface area as calculated from particle size.

TABLE II

| (Comparative) | | | | | | |
| --- | --- | --- | --- | --- | --- | --- |
| Catalyst (Pt) loading (wt %) | 10 | 20 | 30 | 40 | 60 | 80 |
| Catalyst (Pt) Particle Size (nm) | 2.0 | 2.5 | 3.2 | 3.9 | 8.8 | 25 |
| Theoretical Catalyst Surface Area ($m^2/g$) | 140 | 112 | 88 | 72 | 32 | 11 |

SUMMARY OF THE INVENTION

Briefly, the present invention provides a supported catalyst comprising catalyst metal nanoparticles having an average particle size of 3.0 nm or less, more typically 2.5 nm or less, more typically 2.0 nm or less, and most typically 1.8 nm or less, and typically having a standard deviation of particle size of 0.5 nm or less, which are supported on support particles, wherein the weight of catalyst metal nanoparticles in the supported catalyst is 30% or more of the weight of the supported catalyst, more typically 40% or more and more typically 50% or more. Typical catalyst metals are selected from platinum, palladium, ruthenium, rhodium, iridium, osmium, molybdenum, tungsten, iron, nickel and tin. Typical support particles are carbon.

In another aspect, the present invention provides a method of making a supported catalyst comprising the steps of: a) providing a solution of metal chlorides of one or more catalyst metals in solvent system containing at least one polyalcohol, typically ethylene glycol containing less than 10% water; b) forming a colloidal suspension of unprotected catalyst metal nanoparticles by raising the pH of the solution, typically to a pH of 10 or higher, and heating said solution, typically to 125° C. or higher; c) adding support particles to the colloidal suspension; and d) depositing the unprotected catalyst metal nanoparticles on the support particles by lowering the pH of said suspension, typically to a pH of 6.5 or lower, typically by addition of nitric acid.

What has not been described in the art, and is provided by the present invention, is supported catalyst having exceptionally small catalyst nanoparticles deposited on support particles in relatively high loading ratios, and methods of making such supported catalysts by depositing unprotected catalyst nanoparticles on support particles.

In this application:

"unprotected," as used in reference to colloids of metal nanoparticles in organic or aqueous solvent, means dispersed in weakly coordinating or non-coordinating solvent without protecting agents such as surfactants, polymers, or organic ligands; and "particle size" refers to a particle's average diameter.

It is an advantage of the present invention to provide supported catalysts that provide superior performance in electrochemical cells such as fuel cells.

DETAILED DESCRIPTION

The present invention provides a supported catalyst comprising catalyst metal nanoparticles having small average particle sizes even at higher loadings.

As noted in the background section above, conventional methods of producing supported precious metal catalysts are typically unable to produce high loadings without concomitant increases in particle size. The increases particle size limits the usefulness of the catalyst by reducing available surface area. Typical conventional methods include direct reduction of precious metal salts with reducing agents in the presence of a support, such as porous carbon or molecular sieve materials.

The present invention provides a supported catalyst comprising catalyst metal nanoparticles having average particle sizes of 3.0 nm or less, more typically 2.5 nm or less, more typically 2.0 nm or less, and most typically 1.8 nm or less. These sizes are achieved with a typical standard deviation of particle size of 0.6 nm or less, more typically 0.5 nm or less, and most typically 0.4 nm or less. These sizes are achieved with a typical catalyst loading of 30% or more, more typically 40% or more, and most typically 50% or more. Loading percentage refers to the weight of catalyst metal in the supported catalyst as a percentage of the total weight of the supported catalyst.

Any suitable catalyst metals may be used. Typical catalyst metals are selected from platinum, palladium, ruthenium, rhodium, iridium, osmium, molybdenum, tungsten, iron, nickel and tin. Most typically, the catalyst metals include platinum or consist essentially of platinum alone. Combinations of catalyst metals or catalyst alloys may be used. Platinum/ruthenium catalysts may be used for improved CO tolerance.

Any suitable support particles may be used. Typical support particles are carbon, but may also be silica or other porous materials. The support particles typically have high surface area. Typical support particles for fuel cell catalysts are electrically conductive. Typical support particles are high in surface area. Suitable carbon support materials include: Shaw C-55 (Chevron Texaco Corp., Houston, Tex.), Vulcan™ XC-72 carbon black (Cabot Corp., Waltham, Mass.), Black Pearl 2000 Carbon (Cabot Corp., Waltham, Mass.), and the like.

The method according to the present invention avoids the use of protecting agents such as surfactants, polymers, or organic ligands. The use of protecting agents typically leads to poor catalytic activity, since the protecting agent can occupy the activated catalytic sites. In addition, removal of the protecting agents can be difficult. Typically, the catalyst nanoparticles of the present invention are formed and used in weakly coordinating or non-coordinating organic or aqueous solvent.

In the method according to the present invention, a solution of metal chlorides of one or more catalyst metals is made in a solvent system containing at least one polyalcohol. Any suitable chlorides of catalyst metals may be used, including chlorides of the metals disclosed above, such as $H_2PtCl_6$, $RuCl_3$, and the like. Hydrated chlorides may be used. Any suitable concentration of catalyst metal chloride may be used. Typical concentrations are in the range of 0.05–10 wt %. More typical concentrations are in the range of 0.5–5 wt %. The solvent system typically contains at least 10% polyalcohol, more typically 50–100%, more typically 70–100%, more typically 90–100%, more typically 95–100%, and most typically 98–100%. The polyalcohol is typically an alkylene glycol, more typically ethylene glycol. The solvent system may contain water, but typically contains less than 10% water, more typically less than 5% water, and most typically contains less than 2% water. The generation of smaller particles is observed with the use of less water and more ethylene glycol in the solvent system.

In the second step of the method according to the present invention, a colloidal suspension of unprotected catalyst metal nanoparticles is formed by raising the pH of the solution of metal chlorides. Typically the pH is raised to 10 or higher, more typically 11 or higher, and most typically 12 or higher. The pH may be raised by any suitable means, such as the addition of NaOH. After raising the pH, the solution is heated to form the colloidal suspension. Typically the solution is heated to at least 125° C., more typically to at least 150° C., more typically to at least 160° C., and most typically to at least 180° C. The solution is typically not heated to boiling.

In the third step of the method according to the present invention, the support particles, described above, are added to the colloidal suspension of unprotected catalyst metal nanoparticles. Typically, the support particles are subjected to high speed shearing or the like in order to break up agglomerates prior to use.

In the forth step of the method according to the present invention, the unprotected catalyst metal nanoparticles are deposited on the support particles by lowering the pH of the suspension. Typically the pH is lowered to 6.5 or lower, more typically 5 or lower, and most typically 3 or lower. The pH may be raised by any suitable means, such as the addition of nitric acid. The pH lowering step is typically performed slowly.

This invention is useful in the provision of superior catalysts for use in electrochemical cells such as fuel cells.

Objects and advantages of this invention are further illustrated by the following examples, but the particular materials and amounts thereof recited in these examples, as well as other conditions and details, should not be construed to unduly limit this invention.

EXAMPLES

Unless otherwise noted, all reagents were obtained or are available from Aldrich Chemical Co., Milwaukee, Wis., or may be synthesized by known methods.

Catalyst Preparation

Carbon-supported catalysts were prepared as indicated in each of the following Examples.

Example 1

30%Pt/C

Pt nanoparticles were prepared in mixed solvent as follows: 12.5 g of $H_2PtCl_6$ solution (8 wt. % aqueous solution) was added to a 200 ml flask, followed by addition of 40 ml of ethylene glycol. After stirring at room temperature for 10 minutes, 50 ml of 0.5M NaOH (in ethylene glycol) was added to the flask. The solution was heated to 160° C. under nitrogen for 3 hours. A homogeneous, dark colloid solution was obtained.

The Pt particles were supported on carbon as follows: 0.88 g of carbon black Shaw C-55 (Chevron Texaco Corp., Houston, Tex.) and 20 ml of water were then added into the dark colloid solution. This mixture was kept stirring for about 2 weeks at room temperature. Then 20 ml of 1.9 M $HNO_3$ was added with continued stirring. The mixture was stirred for another 30 minutes, then the solid was filtered and washed with de-ionized water 3 times. The wet cake was then re-dispersed into 150 ml of water and the dispersion was stirred overnight. After purging with hydrogen gas for about 2 minutes at room temperature, the solution was filtered again. The solid was washed with copious amount of de-ionized water. Finally, the solid was dried at 110° C. under vacuum for 1 hour. 1.2 g black solid was obtained. The composition was estimated as 30% Pt and 70% carbon, based on the amount of Pt salt and carbon added.

Example 2

30%Pt/C

Pt nanoparticles were prepared in ethylene glycol as follows: 2.0 g of $H_2PtCl_6 \cdot xH_2O$ (Pt content 38–41%) was added to a 500 ml flask, followed by addition of 119 g of ethylene glycol. After stirring at room temperature for 20 minutes, a NaOH solution (2.2 g NaOH in 160 g EG) was added to the flask. The solution was then heated to 160° C. under nitrogen for 3 hours. A homogeneous dark colloid solution formed.

Figure 1:
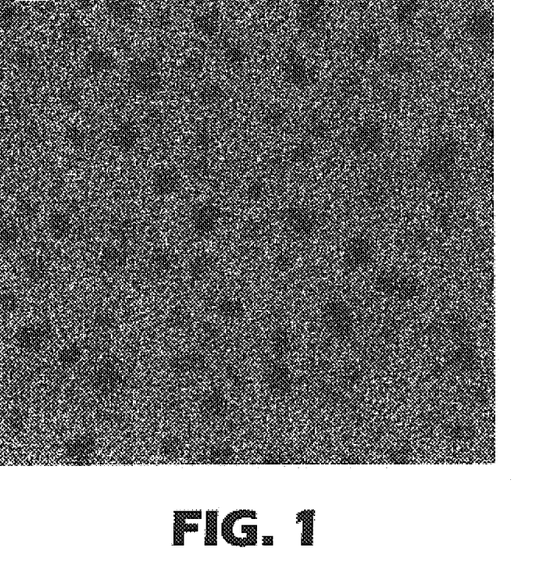
FIG. 1 is a transmission electron micrograph of Pt nanoparticles according to the present invention (see Example 2).

FIG. 1 is a transmission electron micrograph of the Pt nanoparticles of Example 2 demonstrating the small size of the Pt—Ru nanoparticles. The average size is 2.0 nm with a standard deviation of 0.5 nm.

The Pt particles were supported on carbon as follows: 1.8 g of carbon black Shaw C-55 was added to the above colloid solution and the mixture was kept stirring overnight at room temperature. 45 ml of 1.9 M $HNO_3$ was added slowly to the suspension with continued stirring. 4 hours later, the solid was filtered and washed with de-ionized water 3 times. The solid was then re-dispersed in 250 ml water and the dispersion was kept stirring overnight. The solid was then filtered and washed with copious amount of de-ionized water. The composition was estimated as 6% Pt and 14% carbon and 80% of water, based on the amount of Pt salt and Carbon added.

Example 3

50%Pt/C

Pt nanoparticles were prepared in ethylene glycol as in Example 2.

The Pt particles were supported on carbon as follows: 0.90 g of carbon black Shaw C-55 was added to a 400 ml jar with 20 ml of ethylene glycol. The suspension was hand-sheared for 2 minutes. Then 226 g of the dark colloid Pt suspension (Pt: 875 mg) was added to the 400 ml jar. The mixture was kept stirring overnight at room temperature. 60 ml of 1.9 M $HNO_3$ was added to the suspension very slowly with continued stirring. The mixture was stirred overnight, then the solid was filtered and washed with de-ionized water 3 times. The solid was then re-dispersed into 350 ml water and the dispersion was kept stirring for 2 hours. The solid was then filtered and washed with copious amount of de-ionized water. The composition of wet cake was estimated as 12% Pt, 12% carbon and 76% water (49.3% Pt loading on catalyst).

Figure 2:
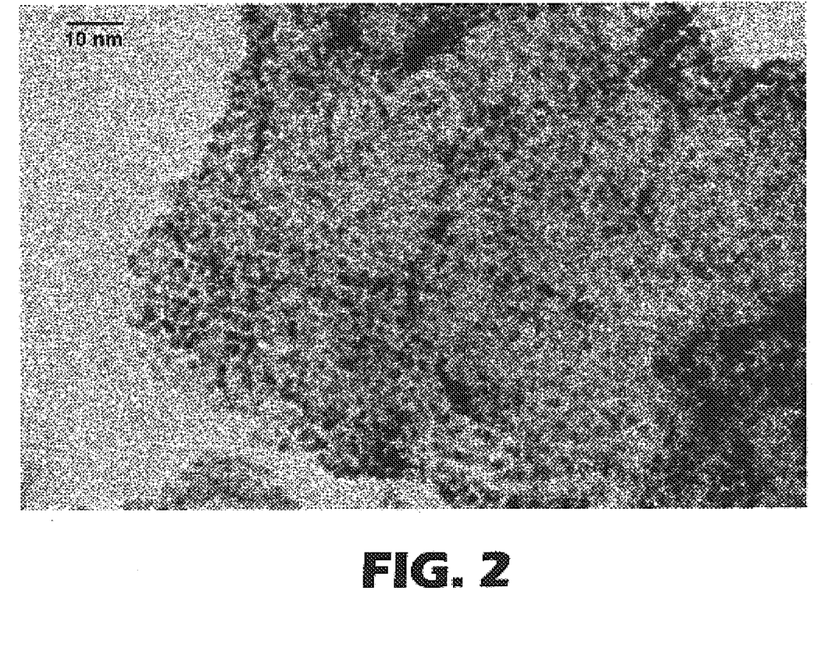
FIG. 2 is a transmission electron micrograph of carbon-supported Pt nanoparticles according to the present invention (see Example 3).

FIG. 2 is a transmission electron micrograph of the carbon-supported Pt nanoparticles of Example 3 demonstrating that the small size of the platinum nanoparticles is preserved in the supported catalyst. The average size is about 2 nm with a narrow size distribution and little or no agglomeration.

Example 4

30% Pt on Vulcan™ XC-72 Carbon

Pt nanoparticles were prepared in ethylene glycol as in Example 2.

The Pt particles were supported on carbon as follows: 0.90 g of Vulcan™ XC-72 carbon black (Cabot Corp., Waltham, Mass.) was added to a 400 ml jar with 20 ml of ethylene glycol. The suspension was hand-sheared for 2 minutes. Then 88.7 g of the dark colloid Pt solution (395 mg of Pt) was added to the 400 ml jar. The mixture was kept stirring overnight at room temperature. 2.3 ml of 1.9 M $HNO_3$ was added to the suspension very slowly with continued stirring. The pH changed from 11.5 to 11.0. The mixture was stirred for 3 hours, then 0.4 ml of 1.9 M $HNO_3$ was added (pH=10.3). 1 hour later, another 0.5 ml of 1.9 M $HNO_3$ was added. The pH of the suspension became 7.4. Finally 5 ml of 1.9 M $HNO_3$ was added to reduce the pH to 1.6. After stirring for another hour, the solid was filtered and washed with de-ionized water 3 times. The solid was then re-dispersed into 100 ml water and the dispersion was kept stirring for 2 hours. The solid was then filtered and washed with copious amount of de-ionized water. The composition of wet cake was estimated as 12% Pt, 12% carbon and 76% water (30.5% Pt loading on catalyst).

Example 5

30% Pt loading on Black Pearl 2000 Carbon

Pt nanoparticles were prepared in ethylene glycol as in Example 2.

The Pt particles were supported on carbon as follows: 0.90 g of Black Pearl 2000 Carbon (Cabot Corp., Waltham, Mass.) was added to a 400 ml jar with 20 ml of ethylene glycol. The suspension was hand-sheared for 2 minutes. Then 88.7 g of the dark colloid Pt solution (395 mg of Pt) from procedure 1 was added to the 400 ml jar. The mixture was kept stirring overnight at room temperature. 2.3 ml of 1.9 M $HNO_3$ was added to the suspension very slowly with continued stirring. The pH changed from 11.5 to 11.0. The mixture was stirred for 3 hours, then 0.4 ml of 1.9 M $HNO_3$ was added (pH=10.3). 1 hour later, another 0.5 ml of 1.9 M $HNO_3$ was added. The pH of the suspension became 7.4. Finally 5 ml of 1.9 M $HNO_3$ was added to reduce the pH to 1.6. The solid was filtered and washed with de-ionized water 3 times. The solid was then re-dispersed into 100 ml water and the dispersion was kept stirring for 2 hours. The solid was then filtered and washed with copious amount of de-ionized water. The composition of wet cake was estimated as 12% Pt, 12% carbon and 76% water (30.5% Pt loading on catalyst).

Example 6

Pt—Ru, 1/1 Ratio

Pt—Ru nanoparticles were prepared as follows: 53.6 mg of $RuCl_3*xH_2O$ (contains Ru: 39.6%) was added to a 100 ml flask. Then 0.25 ml of DI water was added, followed by adding 109 mg of $H_2PtCl_6*yH_2O$ (contains Pt ~39.5%). After the addition of 20 g of ethylene glycol, the solution was stirred at room temperature for 30 minutes. 5 g of 2.5% NaOH solution (in ethylene glycol) was then added into the solution. Finally 4 ml of toluene was added. The solution was connected to a water separator (in order to move water in the system) and heated to 165° C. (oil bath temperature) for 3 hours. A dark brown colloidal solution formed.

Figure 3:
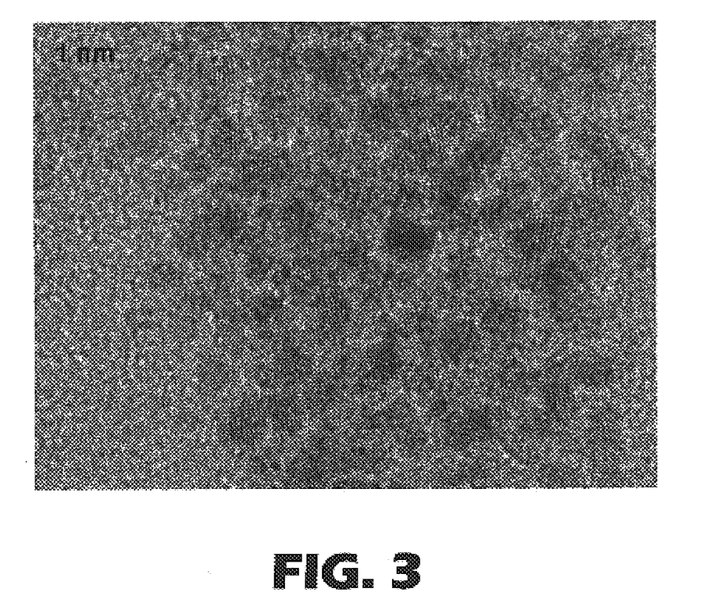
FIG. 3 is a transmission electron micrograph of bimetalic Pt—Ru nanoparticles according to the present invention (see Example 6).

FIG. 3 is a transmission electron micrograph of the bimetalic Pt—Ru nanoparticles of Example 6. The average particle size is 1.8 nm with a standard deviation of 0.4 nm.

Example 7

30% Pt—Ru/C; 1/1 Molar Ratio

Pt—Ru nanoparticles were prepared as follows: 332 mg $RuCl_3*xH_2O$ and 65 g of ethylene glycol were added into a 3-neck 250 ml flask and the system was stirred overnight at room temperature. Then 668 mg $H_2PtCl_6*yH_2O$ was charged into the above flask and the solution was stirred for 15 minutes. Finally, 65 g of 2.5% (by wt.) NaOH solution (in ethylene glycol) was added to the flask. The solution was then heated in an oil bath to 160° C. (oil bath temp.) under nitrogen purge for 3 hours. A dark brown colloidal solution formed.

The Pt—Ru particles were supported on carbon as follows: 920 mg of carbon (Vulcan™ XC-72) and 20 ml of ethylene glycol was added in a 400 ml jar and the suspension was sheared for 2 minutes with a Handishearm hand-held stirrer (Virtis Co., Gardiner, N.Y.) at 30,000 rpm. The dark Pt—Ru colloidal solution (Pt: 264 mg; Ru: 131 mg) was then added into the 400 ml jar. The pH of the suspension was adjusted to 7.0 with 1.86 M $HNO_3$ (dropwise addition) and the system was stirred overnight at room temperature. Then the pH of the system was adjusted to 4.0 with dropwise addition of $HNO_3$ and stirred overnight. Finally the pH was adjusted to about 1.0 with dropwise addition of $HNO_3$ and stirred for 3 hours. The solid was then filtered and washed with de-ionized (DI) water three times. The solid was re-dispersed in 200 ml DI water and the dispersion was kept stirring for 2 hours. The solid was then filtered and washed with copious amount of DI water. The wet cake was dried under vacuum at 110° C. overnight. The molar ratio of Pt—Ru was estimated to be 1.04:1.

Example 8

30% Pt—Ru/C; 2/1 Molar Ratio

Pt—Ru nanoparticles were prepared as follows: 500 mg $RuCl_3*xH_2O$ and 2.2 g of water was added into a 3-neck 250 ml flask and the system was stirred at room temperature for 15 minutes. Water was then removed in an oven at 50° C. 140 g of ethylene glycol was added to the flask to dissolve the $RuCl_3*3H_2O$ salt in about 12 hrs. 2.0 g of $H_2PtCl_6*yH_2O$ was added to the flask and the solution was stirred for 30 minutes. After the addition of 100 g 2.5% by wt. NaOH solution in ethylene glycol, the solution heated in an oil bath to 160° C. (oil bath temp.) under nitrogen purge for 3 hours. A dark brown colloidal solution formed.

Figure 4:
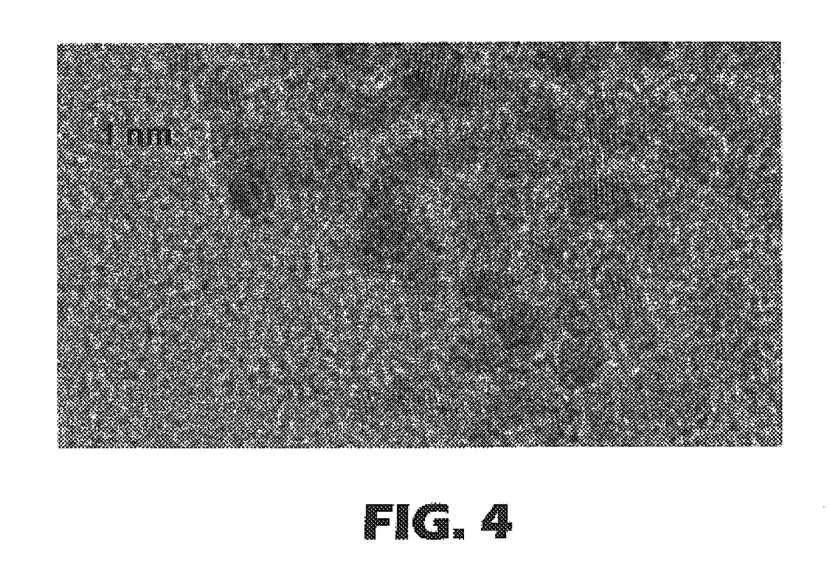
FIG. 4 is a transmission electron micrograph of bimetalic Pt—Ru nanoparticles according to the present invention (see Example 8).

FIG. 4 is a transmission electron micrograph of the bimetalic Pt—Ru nanoparticles of Example 8 demonstrating the small size of the Pt—Ru nanoparticles. The average size is about 2 nm with a narrow size distribution.

The Pt—Ru particles were supported on carbon as follows: 1.40 g of carbon (Vulcan™ XC-72) and 30 ml of ethylene glycol was added in a 400 ml jar and the suspension was sheared for 2 minutes. 146.5 g of the dark Pt—Ru colloidal solution was then added into the 400 ml jar. The pH of the suspension was adjusted to 6.5 with 1.86 M $HNO_3$ (dropwise addition) and the system was stirred overnight at room temperature. Then the pH of the system was adjusted to 3.8 with $HNO_3$ dropwise addition and stirred overnight. Finally the pH was adjusted to about 1.6 and stirred overnight. The solid was filtered and washed with DI water three times. The solid was re-dispersed in 200 ml DI water and the dispersion was kept stirring for 2 hours. The solid was then filtered and washed with copious amount of DI water. The wet cake was dried under vacuum at 110° C. overnight.

Example 9

30% Pt—Ru/C; 1/2 Molar Ratio

Pt—Ru nanoparticles were prepared as follows: 750 mg $RuCl_3*xH_2O$ and 95 g ethylene glycol was added into a 2-neck 250 ml flask and the system was stirred at room temperature overnight. 750 mg of $H_2PtCl_6*yH_2O$ was added to the flask and the solution was stirred for 15 minutes. After the addition of 65 g 2.5% (by wt.) NaOH solution (in ethylene glycol), the solution was stirred for 1 hour at room temperature and then heated in an oil bath to 160° C. (oil bath temp.) under nitrogen purge for 3 hours. A dark brown colloidal solution formed.

The Pt—Ru particles were supported on carbon as follows: 1.32 g of carbon (Vulcan™ XC-72) and 25 ml of ethylene glycol was added in a 400 ml jar and the suspension was sheared for 2 minutes. The dark Pt—Ru colloidal solution was then added into the 400 ml jar. The pH of the suspension was adjusted to 6.9 with 1.86M $HNO_3$ (dropwise addition) and the system was stirred overnight at room temperature. Then the pH of the system was adjusted to 5.5 with $HNO_3$ dropwise addition and stirred overnight. Finally the pH was adjusted to about 1.6 with $HNO_3$ dropwise addition and stirred overnight. The solid was filtered and washed with DI water three times. The solid was re-dispersed in 200 ml DI water and the dispersion was kept stirring for 2 hours. The solid was then filtered and washed with copious amount of DI water. The wet cake was dried under vacuum at 110° C. overnight. The dry catalyst was used in the preparation of ink.

Example 10

30% Pt—Ru/C; 1/1 Molar Ratio

Pt—Ru nanoparticles were prepared as in Example 7 except that the oil bath temperature was controlled at 190° C.

The Pt—Ru particles were supported on carbon as in Example 7. The wet cake was dried under vacuum at 110° C. overnight.

Example 11

30% Pt—Ru/C; 3/1 Molar Ratio

Pt—Ru nanoparticles were prepared as in Example 8 except that the molar ratio of Pt—Ru was 3:1 and the oil bath temperature was controlled at 190° C.

The Pt—Ru particles were supported on carbon as follows: 30 ml of ethylene glycol was added in a small brown jar containing 1.52 g of carbon (Vulcan™ XC-72). Then the carbon black was sheared in ethylene glycol for 2 minutes by using a Handishear homogenizer. The sheared carbon was then added into a 250 ml 3-neck round bottom flask containing 236 g of the colloid solution with $N_2$ purge. The pH of the suspension was adjusted to 6.89 by the addition of 6.0 ml of 0.93M $HNO_3$ (in 1/1 v/v of ethylene glycol/water). The solution was stirred at room temperature for two days. Then 13.0 ml of 0.93M $HNO_3$ were added into this solution very slowly and it was stirred for another two days. After another 40.0 ml of 0.93 M $HNO_3$ were added, the system was stirred 24 hours. Finally, 14.0 ml of $HNO_3$ (0.93 M) were added. The catalyst was separated by filtration after addition of about 250 g of DI water and washed with copious amount of DI water. The catalyst was re-dispersed in DI water (~250 ml), stirred for 2 hours and then filtered. The wet cake was then dried under vacuum at 110° C. overnight.

Figure 12:
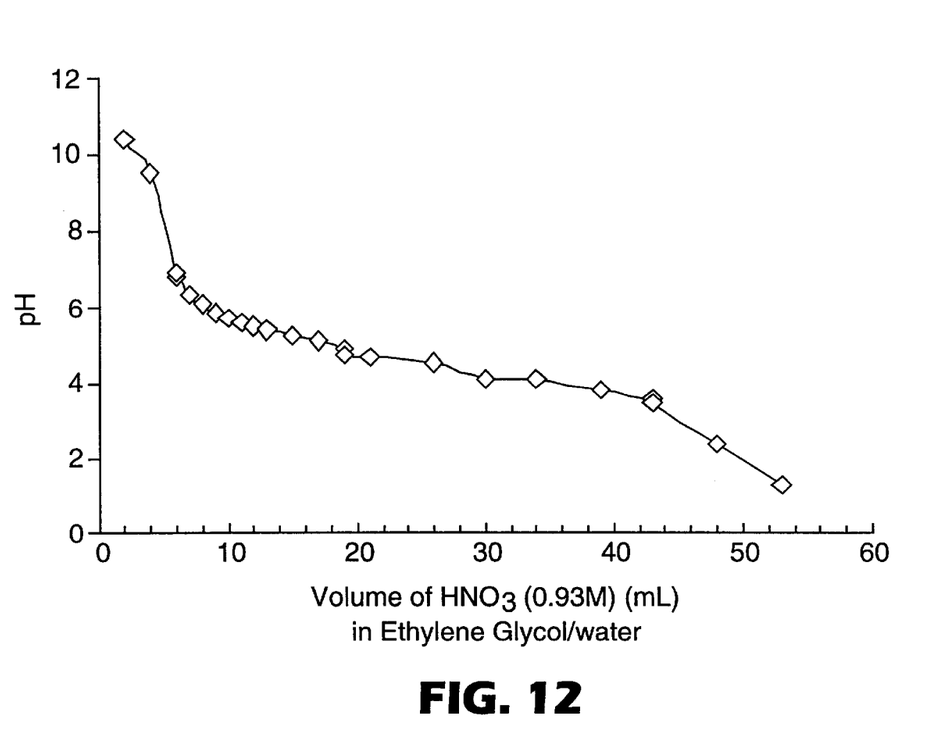
FIG. 12 is a graph of a titration curve obtained during the practice of the present invention (see Example 11).

The titration curve (plot of pH vs. the volume of nitric acid added) is given in FIG. 12. The pH dropped very slowly from 6.5 to 4.0. This is a strong indication that the OH⁻ groups was loosely bound to the alloy surfaces.

Preparation of Catalyst Inks

The carbon-supported catalysts were used to prepare catalyst inks as follows: Table III discloses the weights of supported catalyst, water, and 10% Nafion™ 1000 (SE10172, 10% Nafion 1000 in primarily water, DuPont Chemicals, Wilmington Del.) which were added to a jar (¾ inch (1.9 cm) diameter by 4 inch (10.2 cm) length). The mixture was heated to boiling for 30 minutes. The mixture was then cooled, followed by high shear stirring for 5 minutes with a Handishear™ hand-held stirrer (Virtis Co., Gardiner, N.Y.) at 30,000 rpm. Comparative catalyst C1 was a commercially available E-tek Pt/C catalyst, C3-30 (E-TEK Div. of De Nora N. A., Somerset, N.J.). Comparative catalyst C2 was a commercially available E-tek Pt—Ru(1:1)/C catalyst, C14-30 (E-TEK Div. of De Nora N.A., Somerset, N.J.).

TABLE III

| Ink No. | Catalyst (Ex. No.) | Catalyst Type | Catalyst (gm) | Water (gm) | 10% Nafion (aq.) (gm) |
|---|---|---|---|---|---|
| 1 | 1 | Pt/C | 1.0 | 4.0 | 4.0 |
| 2 | 2 | Pt/C | 1.2 | 4.8 | 4.8 |
| 3 | 3 | Pt/C | 1.2 | 4.2 | 4.2 |
| 4 | 4 | Pt/C | 1.0 | 4.0 | 4.0 |
| 5 | 5 | Pt/C | 1.0 | 4.0 | 4.0 |
| 7 | 7 | Pt-Ru(1-1)/C | 0.9 | 2.0 | 2.7 |
| 8 | 8 | Pt-Ru(2-1)/C | 1.12 | 3.0 | 3.3 |
| 9 | 9 | Pt-Ru(1-2)/C | 1.2 | 3.5 | 3.6 |
| C1 | C1 | Pt/C | 2.0 | 8.0 | 8.0 |
| C2 | C2 | Pt-Ru(1-1)/C | 2.2 | 6.0 | 6.6 |

Preparation of Catalyst-Coated Gas Diffusion Layer

The catalyst inks were used to prepare catalyst-coated gas diffusion layers (CCGDL's) as follows: A 50 cm² piece of Toray™ Carbon Paper (Toray™ 2903, 275 micrometer thickness; Toray Industries, Inc., Tokyo, Japan) was dipped in a 5% solids aqueous Teflon™ dispersion (prepared by diluting a 60% solids aqueous dispersion, Cat. No. T-30, DuPont Chemicals, Wilmington Del.), then dried in an air oven at 50–60° C. to drive off water and form a gas diffusion layer (GDL).

The GDL was coated with a carbon black dispersion as follows: A dispersion of Vulcan™ X72 carbon black (Cabot Corp., Waltham, Mass.) in water was prepared under high-shear stirring using a Roth mixer equipped with a 7.6 cm blade at 4500 rpm. In a separate container, an aqueous dispersion of Teflon™ (T-30, DuPont) was diluted with DI water to 5% solids, to which the carbon black dispersion was added, with stirring. The resulting mixture was filtered under vacuum to obtain a retentate that was approximately 20% solids mixture of water, TEFLON™ and carbon black. The pasty mixture was treated with approximately 3.5% by weight of a surfactant (TRITON X-100, Union Carbide Corp., Danbury, Conn.), followed by the addition of isopropyl alcohol (IPA, Aldrich Chemical Co., Milwaukee, Wis.) such that the w/w proportion of IPA to paste was 1.2:1. The diluted mixture was again stirred at high shear using a three-bladed VersaMixer (anchor blade at 80 rpm, dispersator at 7000 rpm, and rotor-stator emulsifier at 5000 rpm) for 50 minutes at 10° C.

The dispersion thus obtained was coated onto the dried Toray paper at a wet thickness of approximately 0.050 mm using a notch bar coater. Overnight drying at 23° C. to remove IPA was followed by drying in an oven at 380° C. for 10 minutes, to produce a coated GDL of approximately 0.025 mm thickness and a basis weight (carbon black plus TEFLON™) of approximately 25 g/m².

The HGDL thus coated with carbon black was then hand-coated (brushed) with the catalyst dispersion prepared above in an amount yielding 0.4 mg of catalyst metal (Pt or Pt plus Ru) per square centimeter and dried in a vacuum oven at 110° C. for 30 minutes to form a catalyst-coated gas diffusion layer (CCGDL).

Preparation of Polymer Electrolyte Membrane

A polymer electrolyte membrane (PEM) was prepared by notch-coating an aqueous dispersion of Nafion™ 1000 (DuPont Chemical Co.) onto a backing of poly(vinyl chloride)-primed poly(ethylene terephthalate) (3M Co., St. Paul, Minn.) at a loading such that the final, dried film was approximately 25 μm thick. The cast film was first passed through a drying oven at 50–60° C. (approximately 3–4 minutes dwell time), then dried at 130° C. for 4 minutes in an air-impingement oven to remove the remainder of the solvent and to anneal the Nafion™ film. The dried film was peeled from the backing for subsequent use.

Preparation of Five-Layer Membrane Electrode Assembly

The PEM was then sandwiched between two CCGDL's, with the catalyst coating facing the PEM. A gasket of Teflon-coated glass fiber was also placed on each side. The CCGDL's were smaller in surface area than the PEM, and each fit in the window of the respective gasket. The height of the gasket was 70% of the height of the CCGDL, to allow 30% compression of the CCGDL when the entire assembly was pressed. The assembly was pressed in a Carver Press (Fred Carver Co., Wabash, Ind.) for 10 minutes at a pressure of 2.8 MPa (0.20 tons per square inch) and a temperature of 130° C. The polyimide sheets were then peeled away leaving the finished five-layer membrane electrode assembly (MEA).

MEA Performance Measurement

The five-layer MEA was mounted in a test cell station (Fuel Cell Technologies, Inc., Albuquerque, N. Mex.) for dynamic (cyclic voltammetry) and static performance testing. The test station includes a variable electronic load with separate anode and cathode gas handling systems to control gas flow, pressure and humidity. The electronic load and gas flow are computer controlled. Fuel cell polarization curves were obtained under the following test parameters: electrode area, 50 cm$^2$; cell temperature, 70° C.; anode gas pressure (gauge), 0 psig; anode gas flow rate, 800 standard cc/min; anode humidification temperature, 70° C.; cathode gas pressure (gauge), 0 psig; cathode flow rate, 1800 standard cc/min; cathode humidification temperature, 70° C. Humidification of the anode and the cathode gas streams was provided by passing the gas through sparge bottles maintained at the stated temperatures. Each fuel cell was brought to operating conditions at 70° C. under hydrogen and air flows. Test protocols were initiated after 12 hours of operation, at which time the following variables were measured: anode pressure, anode flow, cathode pressure, cathode flow, and cell temperature.

Static Current Measurement

Static performance was measured as the cell potential at 0.6 A/cm2 current density with a one-hour static scan. Conditions were: 70° C. cell temperature, anode and cathode saturated with water vapor, ambient pressure, hydrogen on anode except as noted below and air on cathode with flow of 1.2/2.5 stoichiometry.

Electrochemical Surface Area Measurement

The electrochemically accessible surface determination was based on the phenomena of $H_2$ adsorption/desorption on Pt at the potential immediately preceding hydrogen evolution. It is known that hydrogen will adsorb on a Pt surface and will exchange 220 $\mu$C of charge per 1 cm$^2$ of Pt area in the process. By integration of adsorption/desorption peaks of hydrogen a real-to-geometrical surface area factor can be calculated. The region of voltammogram used for charge integration was between −0.2 and 0.1 V/SCE and was background corrected. The baseline, consisting mainly of charging currents and any impurities present in a system, was estimated based on the 0.1 to 0.4 V/SCE potential window, where no electrochemistry is expected on Pt in 1.0 M $H_2SO_4$ electrolyte. In addition, values of charge exchanged during voltammetric sweep were averaged over negative and positive going scans. The measurement was done by a cyclovoltammetry method on a fuel cell at operating conditions with the gas stream saturated by water.

CO Stripping Test Method

CO oxidation cyclic voltammetry (CV) in the form of CO stripping was performed in order to determine the ability of the catalyst materials to oxidize CO. CO stripping tests were performed as follows: The potentiostat used for these experiments was a Solartron 1280B (Solartron Ltd., UK). The anode of the MEA was the working electrode and the cathode was the counter/reference electrode. The anode of the MEA was supplied with a poisoned fuel stream containing 2% CO in hydrogen at 0/0 psig 70° C. for 5 to 15 minutes, at which point the gas was changed to $N_2$. Cyclic voltammograms were then taken after the open circuit voltage (OCV) had increased from 0.01 to 0.08 volts. The CV scan was done at 25 mV/s and ranged from 0.09 to 0.9 and then back to 0.09. Three scans were taken the first being the strip. This same procedure was repeated three more times to yield four stripping CVs.

Results

Table IV presents and compares electrochemical surface area measurements and static performance results for MEA's made with five carbon-supported Pt catalysts according to the present invention and a comparative catalyst C1 which was a commercially available E-tek catalyst, C3-30 (E-TEK Div. of De Nora N.A., Somerset, N.J.).

TABLE IV

| Catalyst (Ex. No.) | Particle Formation Solvent | Pt Loading on Carbon | Carbon Type | Carbon Surface Area | Pt Loading in Electrodes | Electrochemical Surface Area | Static Performance |
|---|---|---|---|---|---|---|---|
| 1 | H$_2$O/Et(OH)$_2$ | 30% Pt/C | C-55 | 80 m$^2$/g | 0.4 mg/cm$^2$ | 32 m$^2$/g | 670 mV |
| 2 | Et(OH)$_2$ | 30% Pt/C | C-55 | 80 m$^2$/g | 0.4 mg/cm$^2$ | 40 m$^2$/g | 690 mV |
| 3 | Et(OH)$_2$ | 50% Pt/C | C-55 | 80 m$^2$/g | 0.4 mg/cm$^2$ | 42 m$^2$/g | 687 mV |
| 4 | Et(OH)$_2$ | 30% Pt/C | XC-72 | 250 m$^2$/g | 04 mg/cm$^2$ | 45 m$^2$/g | 704 mV |
| 5 | Et(OH)2 | 30% Pt/C | BP-2000 | 1500 m$^2$/g | 0.4 mg/cm2 | 55 m$^2$/g | 650 mV |
| C1 | NA | 30% Pt/C | XC-72 | 250 m$^2$/g | 0.4 mg/cm$^2$ | 32 m$^2$/g | 678 mV |

Catalysts according to the present invention demonstrate smaller particle sizes, as reflected in higher electrochemical surface area for a given weight of catalyst. The particles formed in ethylene glycol without added water (Exs. 2–5) demonstrated the highest surface areas. The estimated particle size is 2 nm for platinum catalyst particles of Example 2–5 and 3 nm for platinum catalyst particles of Example 1. The reported average diameter of platinum catalyst particles for E-Tek C3-30 is 3.2 nm.

Figure 5:
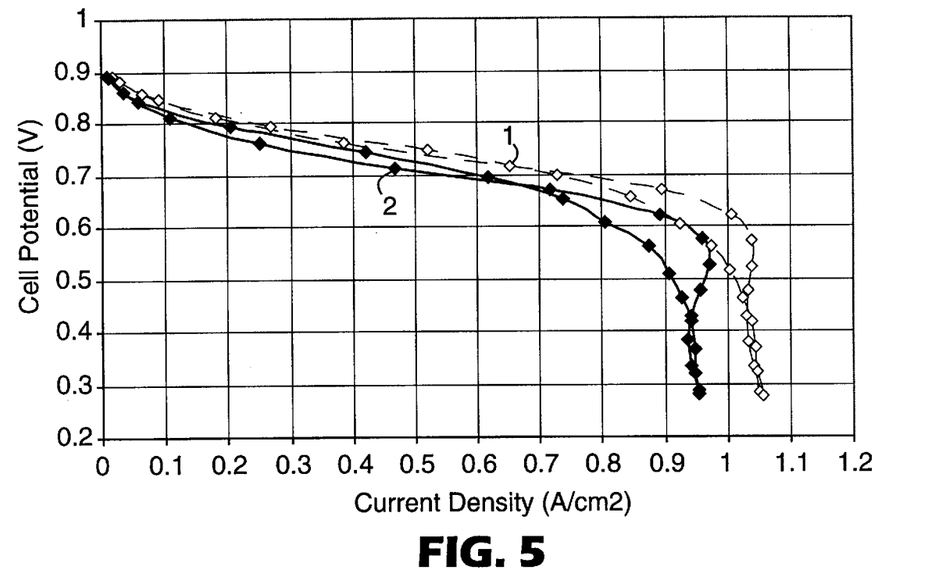
FIG. 5 is a graph representing cyclic voltammetry polarization curves for a membrane electrode assembly (MEA) according to the present invention and a comparative MEA.

FIG. 5 demonstrates a comparison of the dynamic performance of an MEA made with the catalyst of Example 7 (1), which is a catalyst according to the present invention supported on Vulcan™ XC-72 carbon, with an equivalent MEA made with the comparative E-tek catalyst, which is also supported on Vulcan™ XC-72 carbon (2). FIG. 5 demonstrates superior performance with the catalyst according to the present invention.

Figure 6:
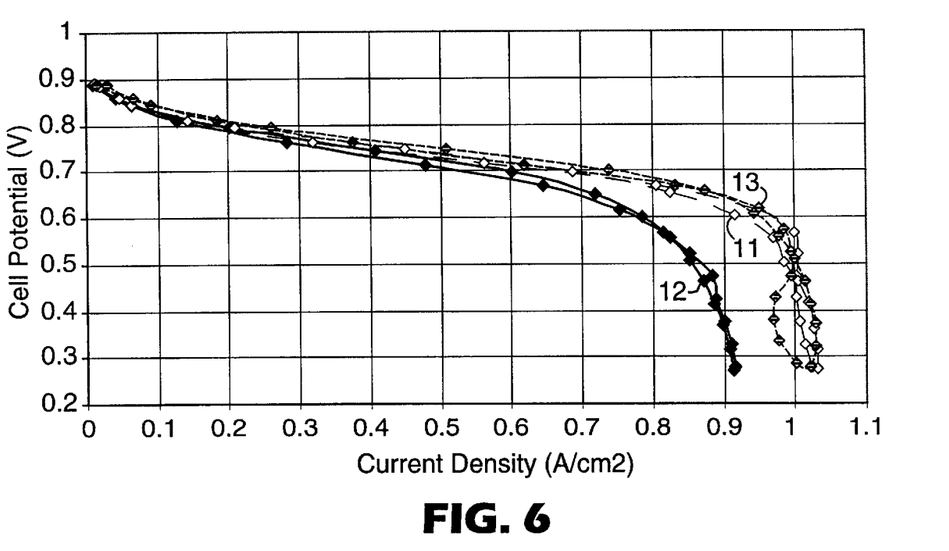
FIG. 6 is a graph representing cyclic voltammetry polarization curves for three MEA's according to the present invention.

FIG. 6 demonstrates a comparison of the dynamic performance of equivalent MEA's made with the catalysts of Examples 1 (12), 2 (11) and 3 (13). Again, the particles formed in ethylene glycol without added water (Exs. 2 and 3) demonstrated the best performance.

Figure 7:
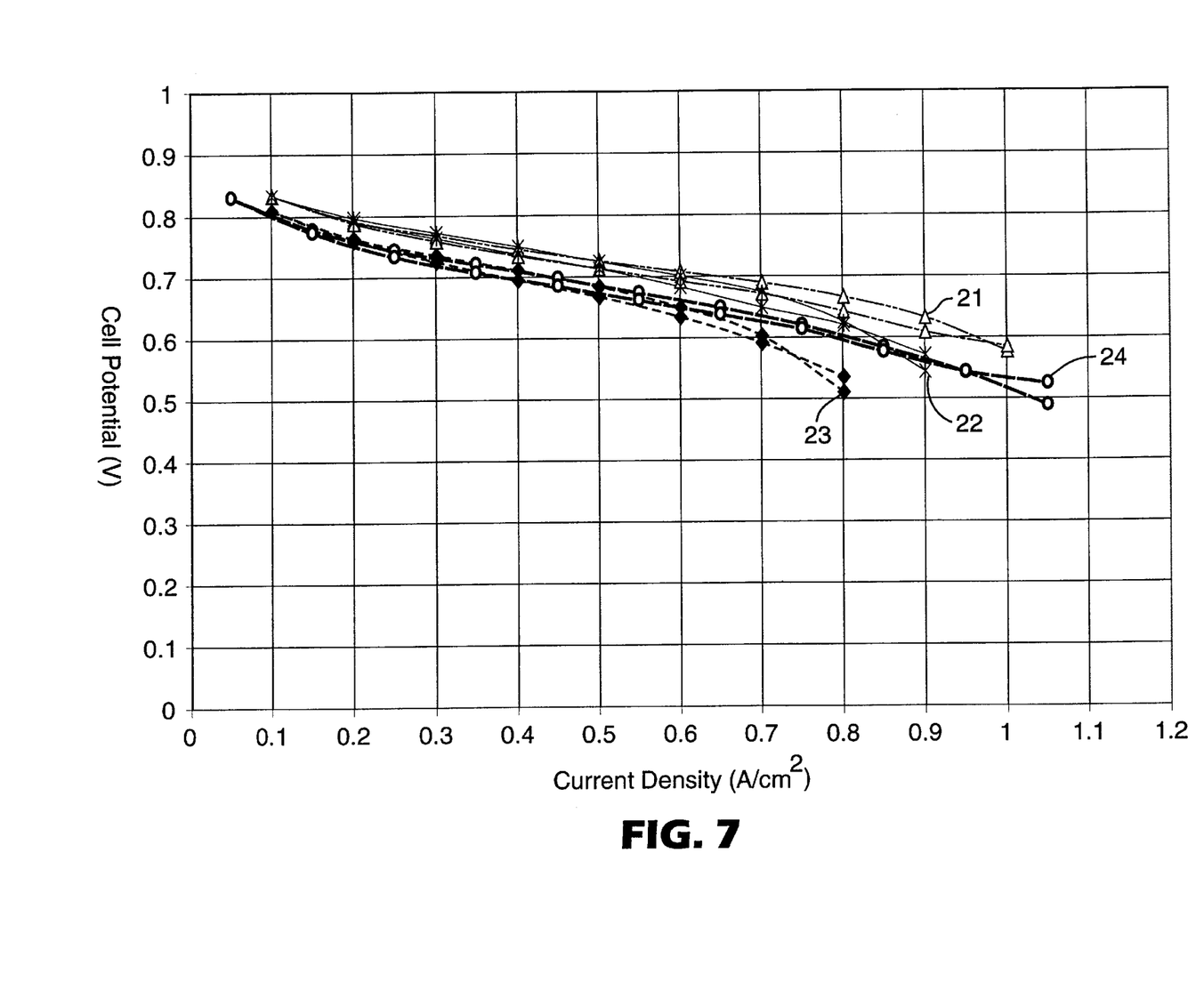
FIG. 7 is a graph representing cyclic voltammetry polarization curves for three MEA's according to the present invention and a comparative MEA.
Figure 8:
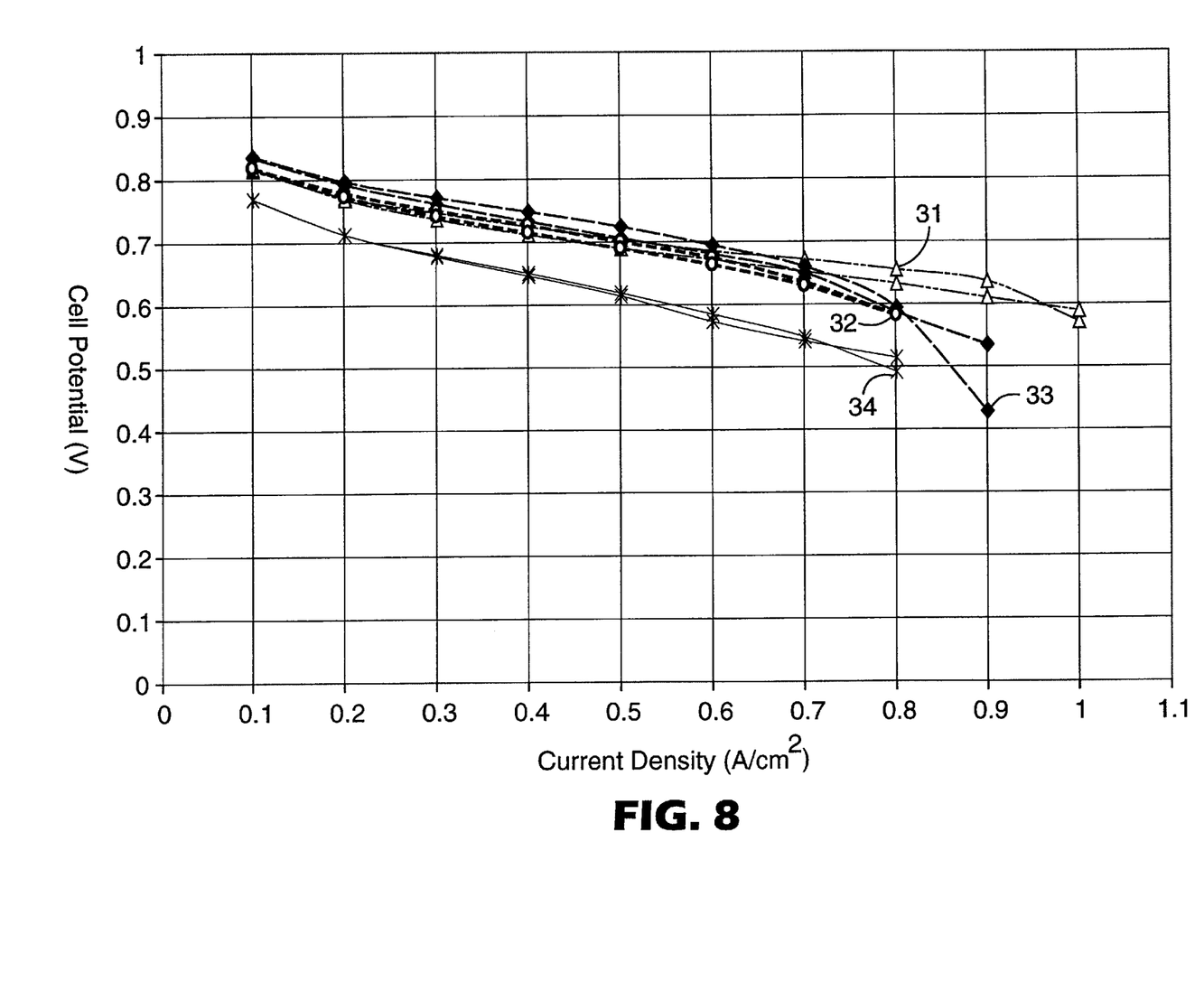
FIG. 8 is a graph representing cyclic voltammetry polarization curves for three MEA's according to the present invention and a comparative MEA.

FIGS. 7 and 8 demonstrate a comparison of the dynamic performance of MEA's made with the catalysts of Example 7 (Pt—Ru 1:1) (FIG. 7, trace 22 and FIG. 8, trace 32), Example 8 (Pt—Ru 2:1) (FIG. 7, trace 21 and FIG. 8, trace 31) and Example 9 (Pt—Ru 1:2) (FIG. 7, trace 23 and FIG. 8, trace 33) with an equivalent MEA made with a comparative commercially available catalyst C2 (Pt—Ru 1:1) (FIG.

Figure 9:
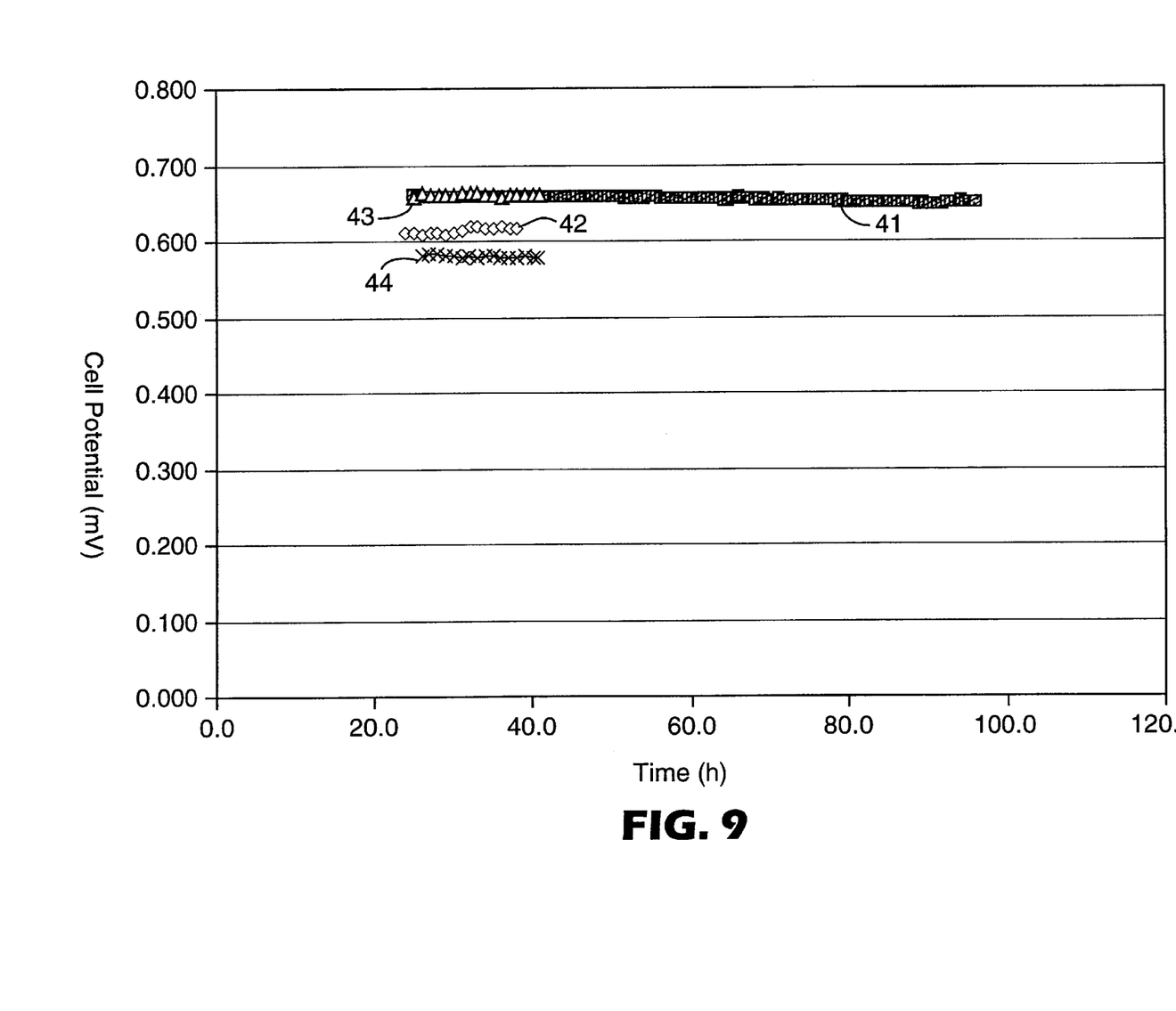
FIG. 9 is a graph representing static current polarization results for three MEA's according to the present invention and a comparative MEA.

7, trace 24 and FIG. 8, trace 34). FIG. 9 demonstrates static current polarization results for Example 7 (Pt—Ru 1:1) (43), Example 8 (Pt—Ru 2:1) (41) and Example 9 (Pt—Ru 1:2) (42) and the comparative catalyst C2 (Pt—Ru 1:1) (44). In the tests reported in FIGS. 8 and 9, the hydrogen fuel was substituted with a reformate fuel containing 35% hydrogen, 33% nitrogen, 22% $CO_2$ and 50 ppm CO, and a 2% air bleed was utilized. Catalysts according to the present invention showed excellent results, particularly when used with the reformate fuel.

Figure 10:
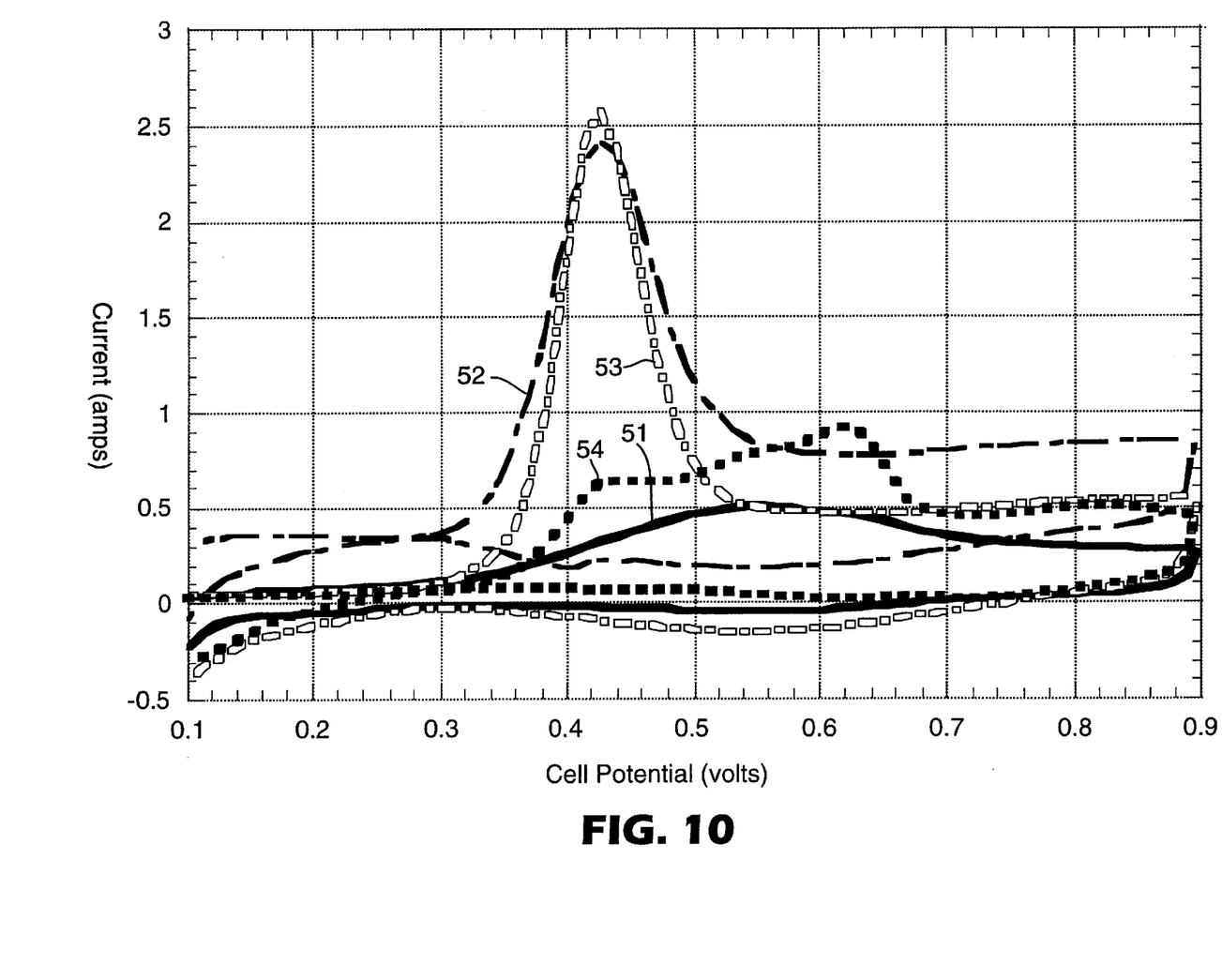
FIG. 10 is a graph of CO stripping results for three MEA's according to the present invention and a comparative MEA.
Figure 11:
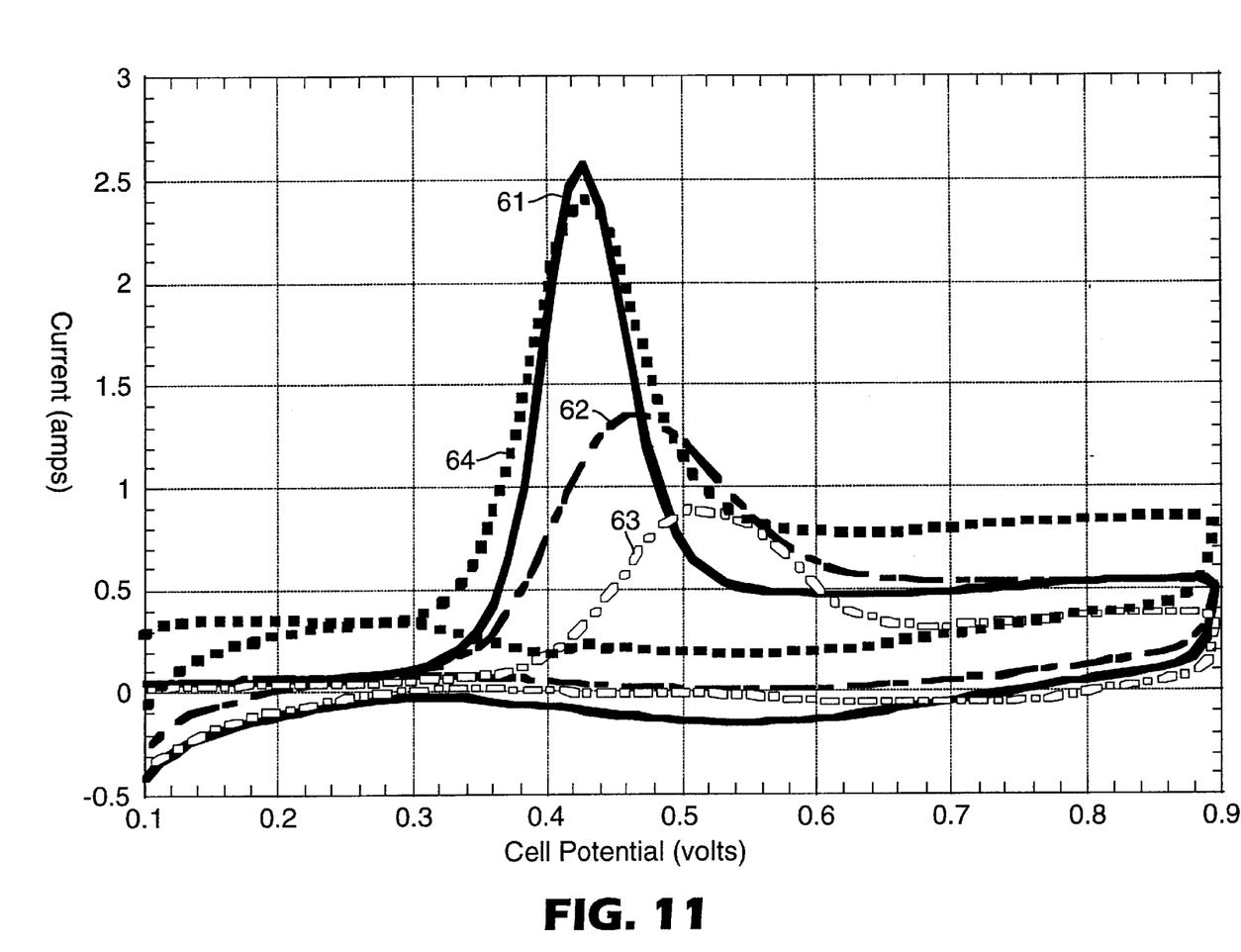
FIG. 11 is a graph of CO stripping results for four MEA's according to the present invention representing three catalysts according to the present invention.

FIGS. 10 and 11 demonstrate CO stripping results for MEA's made with the catalysts of Example 7 (Pt—Ru 1:1) (FIG. 10, traces 52 and 53, and FIG. 11, traces 61 and 64), Example 8 (Pt—Ru 2:1) (FIG. 11, trace 62) and Example 9 (Pt—Ru 1:2) (FIG. 11, trace 63) with an equivalent MEA made with a comparative catalyst C2 (Pt—Ru 1:1) (FIG. 10, trace 51). (FIG. 10, trace 54 represents a supported catalyst that was formed with a low degree of heating in the step of colloid formation.) Catalysts according to the present invention showed superior ability to oxidize CO. Table V summarizes these results.

TABLE V

| Catalyst (Ex. No.) | Pt-Ru Molar Ratio | Average CO Stripping ($C*cm^2$/mg) | Standard Deviation | Average Peak Position (V) |
|---|---|---|---|---|
| 7 | 1:1 | 18.5 | 1.8 | 0.42 |
| 7* | 1:1 | 20.1 | 1.0 | 0.43 |
| 8 | 2:1 | 16.0 | 0.6 | 0.47 |
| 9 | 1:2 | 10.1 | 0.2 | 0.51 |
| C2 | 1:1 | 7.3 | 0.1 | 0.53 |

*duplicate MEA using the same Ex. 7 catalyst.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A method of making a supported catalyst comprising the steps of:
   a) providing a solution of metal chlorides of one or more catalyst metals in solvent system containing at least one polyalcohol;
   b) forming a colloidal suspension of unprotected catalyst metal nanoparticles by raising the pH of said solution and heating said solution;
   c) adding support particles to said colloidal suspension; and
   d) depositing said unprotected catalyst metal nanoparticles on said support particles by lowering the pH of said suspension.

2. The method according to claim 1 wherein said solvent system contains 90–100% of at least one polyalcohol and 10–0% water.

3. The method according to claim 1 wherein said solvent system contains 95–100% of at least one polyalcohol and 5–0% water.

4. The method according to claim 1 wherein said solvent system contains 98–100% of at least one polyalcohol and 2–0% water.

5. The method according to claim 4 wherein said at least one polyalcohol is ethylene glycol.

6. The method according to claim 1 wherein said at least one polyalcohol is ethylene glycol.

7. The method according to claim 1 wherein said step of forming a colloidal suspension of unprotected catalyst metal nanoparticles is achieved by raising the pH of said solution to 10 or higher.

8. The method according to claim 1 wherein said step of depositing said unprotected catalyst metal nanoparticles on said support particles is achieved by lowering the pH of said suspension to 6.5 or lower.

9. The method according to claim 8 wherein said step of depositing said unprotected catalyst metal nanoparticles on said support particles is achieved by lowering the pH of said suspension by addition of nitric acid.

10. The method according to claim 1 wherein said support particles comprise carbon.

11. The method according to claim 1 wherein said support particles consist essentially of carbon.

12. The method according to claim 1 wherein at least one of said catalyst metals is selected from the group consisting of platinum, palladium, ruthenium, rhodium, iridium, osmium, molybdenum, tungsten, iron, nickel and tin.

13. The method according to claim 12 wherein said catalyst metals consist essentially of platinum.

14. The method according to claim 12 wherein said catalyst metals consist essentially of platinum and ruthenium.

15. The method according to claim 1 wherein said supported catalyst comprises catalyst metal nanoparticles having an average particle size of 3.0 nm or less and the weight of catalyst metal nanoparticles in the supported catalyst is 30% or more of the weight of the supported catalyst.

16. The method according to claim 15 wherein said catalyst metal nanoparticles have an average particle size of 2.5 nm or less.

17. The method according to claim 15 wherein said catalyst metal nanoparticles have an average particle size of 2.0 nm or less.

18. The method according to claim 15 wherein said catalyst metal nanoparticles have an average particle size of 1.8 nm or less.

19. The method according to claim 18 wherein said catalyst metal nanoparticles have a standard deviation of particle size of 0.5 nm or less.

20. The method according to claim 15 wherein said catalyst metal nanoparticles have a standard deviation of particle size of 0.5 nm or less.

21. The method according to claim 15 wherein the weight of catalyst metal nanoparticles in the supported catalyst is 40% or more of the weight of the supported catalyst.

22. The method according to claim 15 wherein the weight of catalyst metal nanoparticles in the supported catalyst is 50% or more of the weight of the supported catalyst.

* * * * *

UNITED STATES PATENT AND TRADEMARK OFFICE
CERTIFICATE OF CORRECTION

PATENT NO.    : 6,686,308 B2
DATED         : February 3, 2004
INVENTOR(S)   : Mao, Shane S.

It is certified that error appears in the above-identified patent and that said Letters Patent is hereby corrected as shown below:

<u>Title page,</u>
Item [56], References Cited, OTHER PUBLICATIONS, "Nanocrystaline" should read -- Nanocrystalline --

<u>Column 3,</u>
Line 30, "The increases" should read -- The increased --

<u>Column 4,</u>
Line 45, "forth" should read -- fourth --

<u>Column 7,</u>
Line 9, "(contains Ru: 39.6%)" should read -- "(contains Ru: ~39.6%)
Line 40, "Handishearm" should read -- Handishear$^{TM}$ --

<u>Column 11,</u>
Line 19, "A/cm2" should read -- A/cm$^2$ --

<u>Column 12,</u>
Line 19, "Cl" should read -- C1 --
Line 32, Table IV, "04" should read -- 0.4 --
Line 35, Table IV, "mg/cm2" should read -- mg/cm$^2$ --
Line 45, "Example" should read -- Examples --

Signed and Sealed this

Sixth Day of July, 2004

JON W. DUDAS
*Acting Director of the United States Patent and Trademark Office*